(12) United States Patent
Reinhart

(10) Patent No.: US 8,216,399 B1
(45) Date of Patent: Jul. 10, 2012

(54) QUENCH TANK WATER CIRCULATION LOOP

(75) Inventor: Peter Reinhart, Russells Point, OH (US)

(73) Assignee: Honda Motor Co., Ltd., Tokyo (JP)

( * ) Notice: Subject to any disclaimer, the term of this patent is extended or adjusted under 35 U.S.C. 154(b) by 658 days.

(21) Appl. No.: 12/346,016

(22) Filed: Dec. 30, 2008

(51) Int. Cl.
*C21D 1/58* (2006.01)

(52) U.S. Cl. .................... 148/637; 148/654; 266/46

(58) Field of Classification Search .................. 148/637, 148/654; 266/46, 117, 134
See application file for complete search history.

(56) References Cited

U.S. PATENT DOCUMENTS

| | | | |
|---|---|---|---|
| 3,792,844 | A | 2/1974 | Berry, III et al. |
| 6,435,198 | B2 | 8/2002 | Berger et al. |
| 7,341,155 | B2 | 3/2008 | Whitney |
| 7,388,177 | B2 | 6/2008 | Coomer |
| 2006/0081506 | A1 | 4/2006 | Whitney |

*Primary Examiner* — Sikyin Ip
(74) *Attorney, Agent, or Firm* — Rankin Hill & Clark LLP

(57) ABSTRACT

An improved quenching process is provided by supplying a secondary quenching tank with cooling medium from the pit of a forging press. Only heated, but unprocessed, billets are quenched in the secondary quench tank. The cooling medium from the pit of the forging press is not as clean as fresh water, but because the billets will be reheated, forged and quenched later with a fresh or conditioned cooling medium, the secondary tank quenching medium quality is not restrictive.

9 Claims, 2 Drawing Sheets

QUENCH TANK WATER CIRCULATION LOOP

BACKGROUND OF THE INVENTION

In many forging processes, a billet or other form of raw material is heated prior to being plastically deformed in a press. After the deformation step, the finished part is cooled by being placed in a quench tank. The rate of cooling provided by the quench tank helps determine the structural properties of the finished product. Often, due to an interruption of production of the forging press or problem reaching desired temperatures in a preheat furnace, billets that have been heated cannot be used in the press. However, due to the risks involved with movement and storage of hot billets, these billets are sent directly to a second quench tank, so they can be cooled, stored and reused at another time.

In the most common version of either type of quench tank, fresh water is input on one side of the tank, and as this causes the water level in the quench tank to rise, an overflow drain is used to remove excess cooling water. Fresh water provides a good medium for cooling and also for removing impurities or scale from the surface of a finished part. As the cooling water flows into the drain, these impurities are taken away. Water leaving the quench tank through the drain may be treated or otherwise moved off site. Depending on the cost of water supply and disposal, quench water may be treated and reused, however, treatment costs may be high.

What is desired is an improved quenching process for use in association with forging or other industrial operations.

BRIEF SUMMARY OF THE INVENTION

In the present invention, an improved quenching system and process is provided which supplies a secondary quenching tank (which cools unused billets or other shapes) with a lubricating/cooling medium from the pit of a forging press. Only heated but unprocessed billets, or material of other shapes, are quenched in the secondary quench tank. Finished parts are cooled in a primary quench tank utilizing a different cooling medium. The lubricating/cooling medium from the pit of the forging press is not as clean as fresh water, but because the billets will be reheated, forged and quenched later with a fresh or conditioned cooling medium in the primary tank, the secondary tank quenching medium quality is not a critical characteristic. Overflow from the secondary tank is returned to the press pit.

These and other features, aspects and advantages of the present invention will be fully described by the following description, appended claims, and accompanying drawings.

BRIEF DESCRIPTION OF THE FIGURES

In the following figures, the same or similar types of elements or corresponding parts are provided with the same reference numbers in order to prevent the item from needing to be reintroduced.

DETAILED DESCRIPTION OF THE INVENTION

Figure 2:
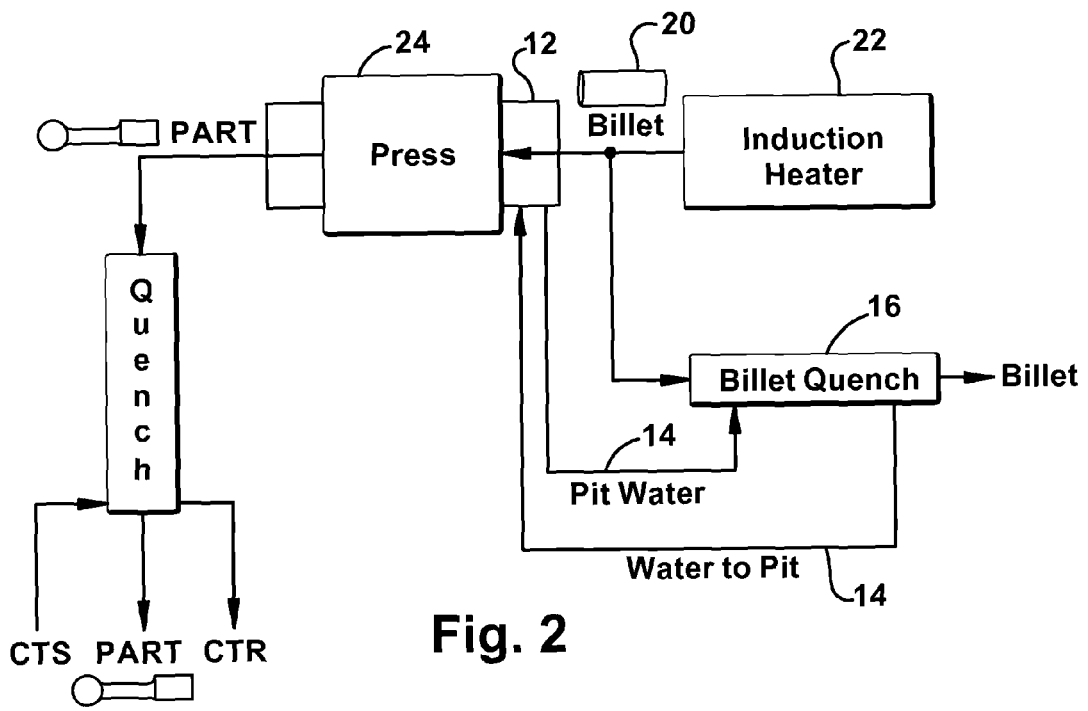
FIG. 2 is a schematic view of the forging process of the present invention.
Figure 3:
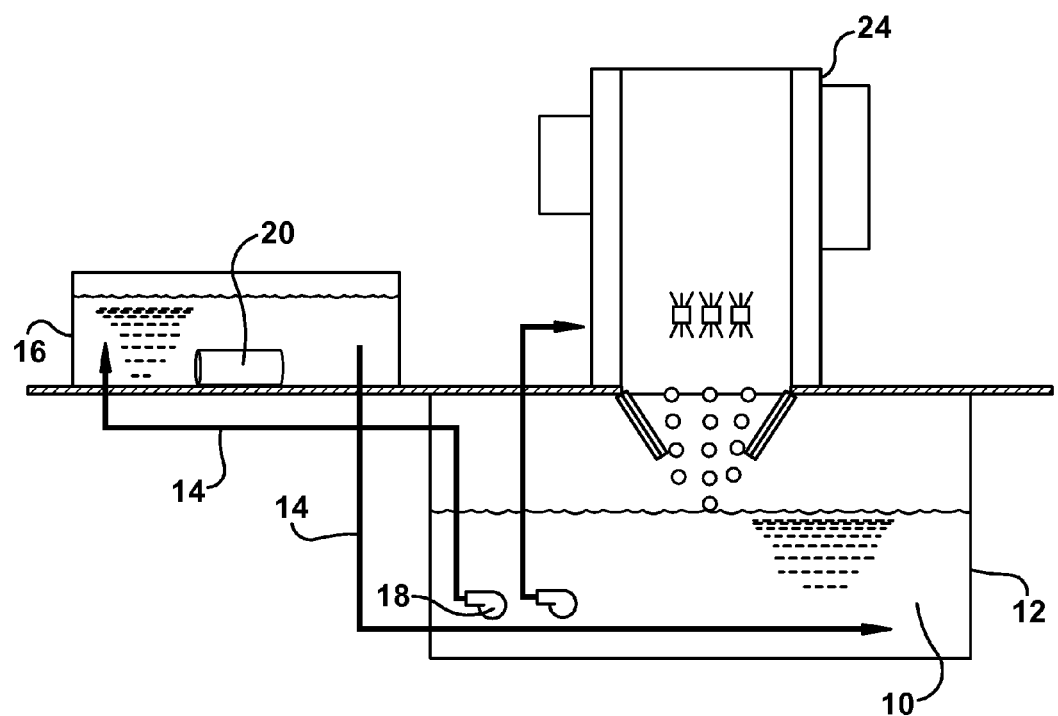
FIG. 3 is an alternate view of the forging process of the present invention.

Referring to the drawings, specifically FIGS. 2 and 3, a preferred process for quenching hot forging billets for reuse is shown. The process includes the steps of taking a lubricating/cooling medium 10 from the pit 12 of a forging press 24 and supplying it to a secondary quench tank 16. The lubricating/cooling medium 10 is also returned to the press pit 12.

Figure 1:
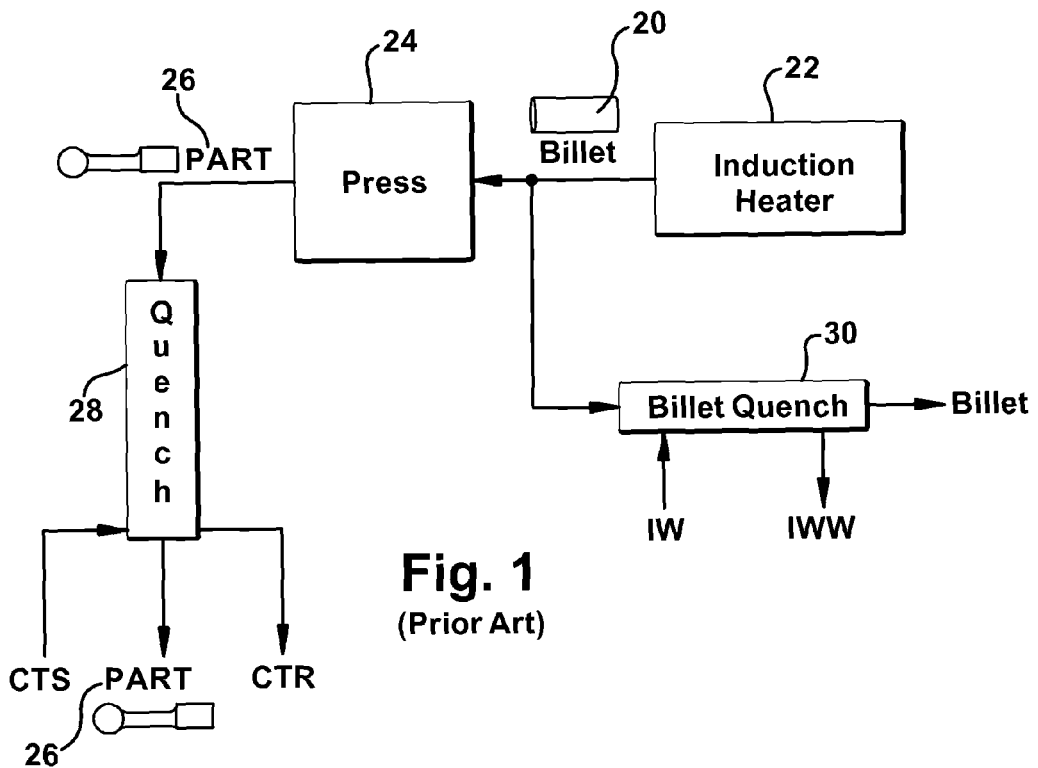
FIG. 1 is a schematic view of a typical forging process.

Referring to FIG. 1 a typical forging operation is shown schematically. Billets 20 are heated in an induction heater 22 preheat device and transferred to a forging press 24. Parts leaving the induction heater 22 are typically at a temperature of about 1200 C. Typically, a 1600 kilowatt induction heater is used. Within the forging press 24, the billet 20 is plastically deformed in a known manner to create a part 26. The part 26 is then moved to a primary quench tank 28 where the part 26 is cooled. The part 26 is then removed from the primary quench tank 28 as a finished part or transferred for subsequent processing. The primary quench tank 28 is supplied with water from a cooling tower (CTS) or from a city water source. Discharge from the primary quench tank (CTR) may be recycled or sent to a sewer.

If the forging press 24 is unable to process a heated billet 20 or the press otherwise shut down, the heated billets 20 are transferred to a secondary quench tank 30 for cooling and reuse. The secondary quench tank 30 is supplied with industrial water (IW) and discharges industrial waste water (IWW).

Referring to FIG. 2, a configuration is shown, which is according to the present invention. Here, instead of industrial water or cooling tower water being supplied to a secondary quench tank 16 and the overflow being piped away for treatment, the secondary quench tank 16 is supplied from a press pit 12 of the forging press 24. Preferably, a pump 18 moves the lubricating/cooling medium 10 in the pit 12 upward to the secondary quench tank 16 and then the tank overflow travels by gravity back to the pit 12. Plumbing 14 is used for transferring the lubricating/cooling medium to and from the pit 12. Different plumbing is used to supply the forging press 24 from the pit 12.

Press pits 12 are well known in the art and hold what is typically a mixture of water and lubricants. The lubricants minimize wear on the press dies and prevent the forged part from sticking to the die. The pit 12, being below ground level, acts as a cooling chamber for the mixture, which becomes heated during the forging process. Also, the pit 12 acts as a convenient catch mechanism if the lubrication/cooling medium is sprayed at any time during the forging process.

Preferably, in the present invention the pit 12 is maintained at about 77 degrees Fahrenheit. In the secondary tank 16, billets 20 are reduced to a temperature of about 40 C to 60 C. On the average, an individual billet 20 stays for about 4 minutes within the secondary quench tank 16.

Thus, the lubricating/cooling medium within the pit 12 is used for two different purposes: lubrication of components of the press, and cooling of billets in the secondary quench tank 16.

The lubricating/cooling medium within the pit 12 is pumped to the quench tank 16 at a rate of approximately 200 gallons per minute. The pumps that pump the lubricating/cooling medium raise the lubricating/cooling medium approximately 15 feet vertically to reach the quench tank 16.

Instead of taking cooling medium from a forging press directly associated with the secondary tank, the cooling medium may be taken from another nearby pit. As an alternate to forging, any other type of press using a pit and a quench tank can implement the present invention. Parts are described as being supplied in a billet form, but may be in other forms as well.

The present invention saves on the consumption of fresh water and the treatment of used quench tank water. By using the lubricating/cooling medium in the press pit for two purposes, stagnation within the press pit is minimized.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A method of quenching workpieces associated with a press, comprising the steps of:
    providing a press including an associated pit containing a lubricating/cooling medium used to lubricate press components;
    providing a quench tank with lubricating/cooling medium taken from the pit of the press;
    preheating a workpiece prior to processing the workpiece within the press;
    directing the workpiece away from the press prior to processing and to the quench tank; and
    quenching the workpiece in the quench tank.

2. The method of claim 1, further comprising the step of returning lubricating/cooling medium from the quench tank to the pit.

3. The method of claim 1, further including the step of, after the quenching step, reheating the workpiece and subsequently processing the workpiece in the press.

4. The method of claim 1, wherein the workpiece is in the form of a billet.

5. The method of claim 1, wherein the lubricating/cooling medium is supplied to the quench tank and a rate of approximately 200 gallons per minute.

6. The method of claim 1, wherein the lubricating/cooling medium is pumped at least 15 feet vertically from the pit to the quench tank.

7. The method of claim 2, wherein piping is used for transferring the lubricating/cooling medium from the quench tank back to the pit.

8. The method of claim 1, wherein a pump is used to provide lubricating/cooling medium from the pit to the quench tank.

9. The method of claim 8, further comprising the step of pumping lubricating/cooling medium to the press from the pit using a second pump.

* * * * *